United States Patent
Baudier et al.

[11] 3,883,267
[45] May 13, 1975

[54] BLADES MADE OF COMPOSITE FIBROUS MATERIAL, FOR FLUID DYNAMIC MACHINES

[75] Inventors: Claude Paul Baudier, Antony; Jean Georges Bouiller, Brunoy; Pierre Michel Teysseyre, Paris; Claude Zabukovec, Brunoy, all of France

[73] Assignee: Societe Nationale d'Etude et de Construction de Moteurs d'Aviation, Paris, France

[22] Filed: Aug. 6, 1973

[21] Appl. No.: 385,712

[30] Foreign Application Priority Data
Aug. 4, 1972  France .................... 72.28342

[52] U.S. Cl. .................... 416/230; 416/241
[51] Int. Cl. .................... F01d 5/14
[58] Field of Search ............ 416/229, 230, 241 A; 29/156.8

[56] References Cited
UNITED STATES PATENTS

| | | | |
|---|---|---|---|
| 3,294,366 | 12/1966 | Coplin | 416/224 |
| 3,368,795 | 2/1968 | Bolin et al. | 416/229 X |
| 3,532,438 | 10/1970 | Palfreyman et al. | 416/213 |
| 3,556,675 | 1/1971 | Howald | 416/192 |
| 3,600,103 | 8/1971 | Gray et al. | 416/241 A |
| 3,602,608 | 8/1971 | Morley | 416/224 |
| 3,731,360 | 5/1973 | Stone | 416/241 A |
| 3,758,234 | 9/1973 | Goodwin | 416/230 |
| 3,762,835 | 10/1973 | Carlson et al. | 416/230 X |

FOREIGN PATENTS OR APPLICATIONS

| | | | |
|---|---|---|---|
| 1,923,888 | 12/1970 | Germany | 416/230 |
| 1,950,731 | 8/1970 | Germany | 416/230 |

*Primary Examiner*—Everette A. Powell, Jr.
*Attorney, Agent, or Firm*—Watson, Cole, Grindle & Watson

[57] ABSTRACT

A blade for a fluid dynamic machine, said blade comprising an air-foil section constituted by the superimposition upon a metal core, of a plurality of superimposed layers of composite fibrous material, said metal core having a portion which projects beyond said airfoil section in order to act as a blade attachment root, wherein said layers of composite fibrous material are arranged each with an orientation such that the angle $\alpha$ made between the general direction of the fibres in a layer and the axis of the blade, diminishes, in absolute value, from a maximum value for the innermost layer or layers which are next to the core to a minimum value for the outermost layer or layers which are next to the surface of the airfoil section.

5 Claims, 4 Drawing Figures

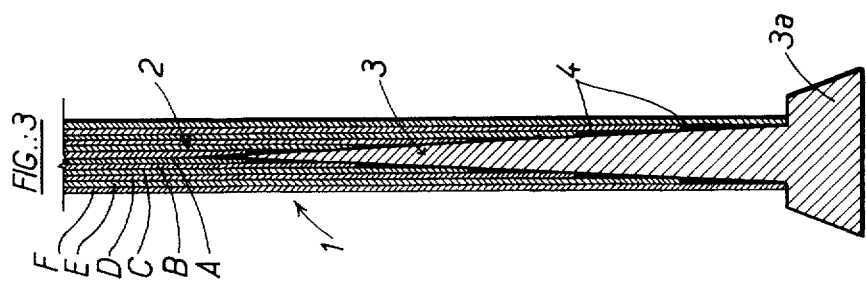
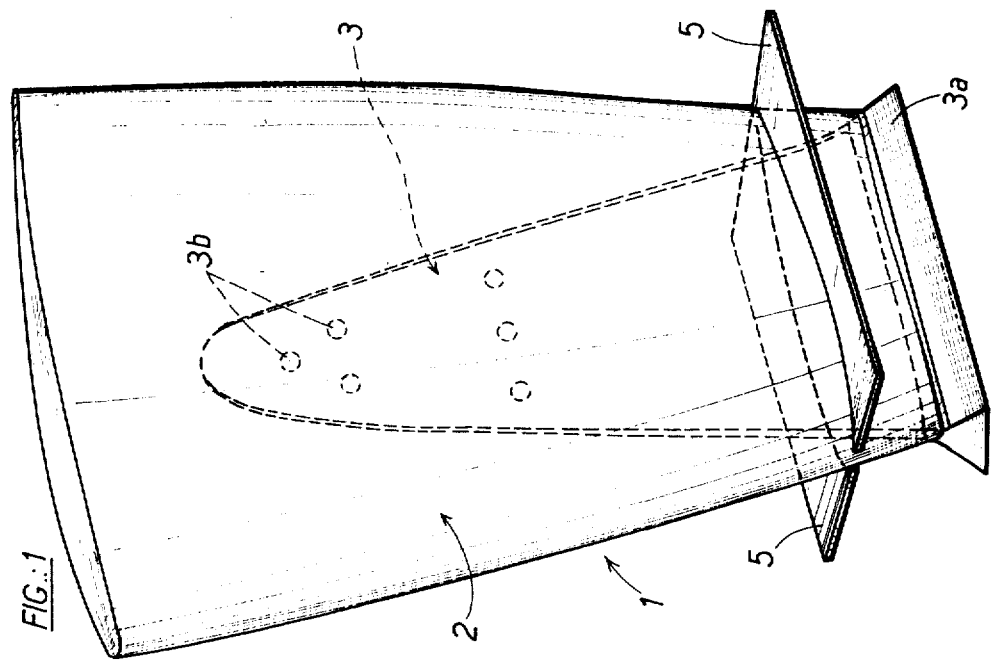

BLADES MADE OF COMPOSITE FIBROUS MATERIAL, FOR FLUID DYNAMIC MACHINES

The present invention relates to a blade for a fluid dynamic machine, of the kind comprising an airfoil section constituted by the superimposition upon a metal core, of a plurality of superimposed layers of composite fibrous material, and a blade attachment or root section constituted by a metal portion integral with and projecting from said metal core beyond said airfoil section.

The term "blade" as utilized hereinafter, should be understood in the broadest sense and embraces vanes, paddles or similar components of the kind used in rotors and stators of fluid dynamic machines such as compressors, turbines and pumps, etc.

The expression "composite fibrous material" will be utilized hereinafter to designate any material which comprises at least the following two basic constituent elements:

A matrix, which may be metallic, ceramic or plastics (for example, a synthetic resin);

and a fibrous reinforcement having high-grade mechanical characteristics (high tensile strength and high modulus of elasticity), for example based on fibres or filaments of carbon, boron, glass, etc., possibly woven.

A blade made of composite fibrous material, but with a core and root of metal, unites the two following advantages:

It has a strength sufficient to cope with the stresses due to centrifugal force, bending, torsion and vibrations, and a much smaller mass than a blade made of metal alone. It can be attached in a conventional manner by its metal root to a supporting structure (such as a rotor disc or drum, or a stator ring or casing) and this is beneficial insofar as a blade root made of metal, has much better resistance than a blade root made of composite fibrous material, to hammering (repeated shock loading in operation) and to friction in its seating.

However, a difficulty has been encountered due to the fact that the metal of the core has a modulus of elasticity and a coefficient of thermal expansion, which differ from those of the composite fibrous material. These properties, in the case of the composite fibrous material also vary very radically with the direction of application in relation to the direction of the fibres. It has been established that, in the direction of the fibers, the modulus of elasticity is maximum and the coefficient of thermal expansion minimum, whilst at 90° to the said direction, the reverse is true.

The result of this is that, under the effect of mechanical stresses and variations of temperature to which the blade is subjected in operation, the core expands or becomes deformed in a different fashion than the rest of the blade. Shear stresses thus develop at the interface between the metal and the composite fibrous material, said interface normally being occupied by a bonding material (such as an adhesive or a material of the same composition as the matrix) designed to ensure cohesion between the core and the remainder of the blade and it will be appreciated that, if these shear stresses are sufficiently high, they can seriously jeopardize this bond.

The present invention aims at reducing the above-mentioned disadvantages.

To this end, in accordance with the invention, there is provided a blade for a fluid dynamic machine, said blade comprising an airfoil section constituted by the superimposition upon a metal core, of a plurality of superimposed layers of composite fibrous material, and a blade attachment or root section constituted by a metal portion integral with and projecting from said metal core beyond said airfoil section, wherein said layers of composite fibrous material are arranged each with an orientation such that the angle $\alpha$ made between the general direction of the fibres in a layer and the axis of the blade, diminishes, in absolute value, from a maximum value for the innermost layer or layers which are next to the core to a minimum value for the outermost layer or layers which are next to the surface of the airfoil section.

In accordance with a preferred embodiment of the invention, said layers are superimposed in accordance with a stepped disposition such that one layer, in relation to an adjacent underlying layer, has a portion offset in the direction of the blade root, said offset portion forming a step by which the layer in question is attached to the core of the blade.

These arrangements, as will be explained hereinafter, make it possible to contrive a regular and progressive transfer of stresses between the composite fibrous material and the core metal of the blade.

In accordance with another feature of the invention, the core of the blade forms part of an integral metal assembly incorporating the leading and trailing edges of the blade. The blade is thus better protected against abrasion or erosion due to the impact of solid or liquid materials.

The invention will now be further described, by way of non-limitative example, with reference to the accompanying drawings, in which:

FIG. 1 is a perspective view of one embodiment of a blade according to the invention;

FIG. 3 is a section taken on the line III—III of the blade shown in FIG. 2; and

Figure 2:
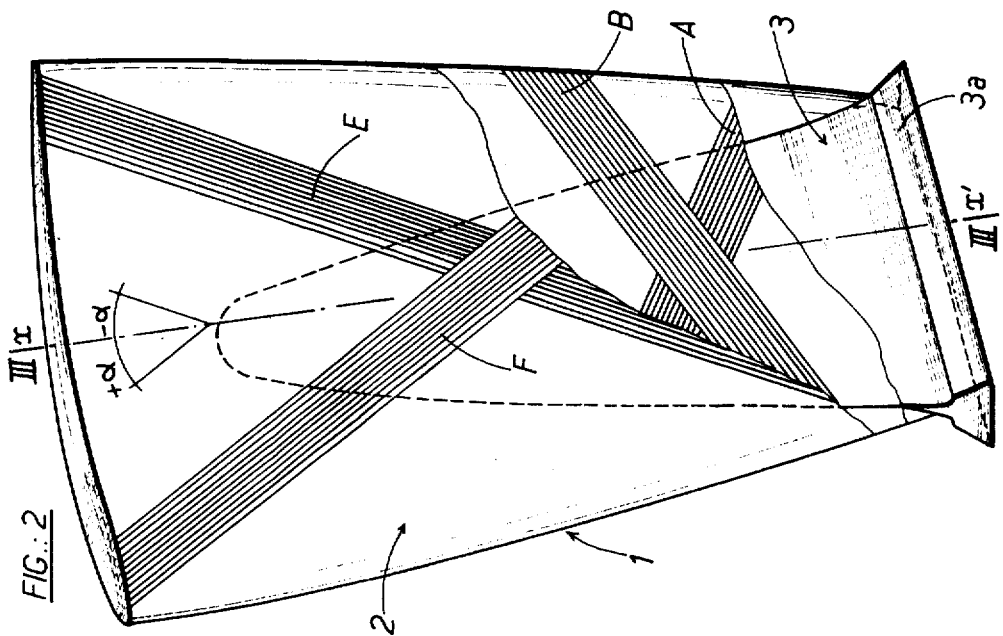
FIG. 2 is a view, partially cut away, of the blade shown in FIG. 1.

In FIGS. 1 to 3 the general reference 1 has been used to designate a blade of root-to-tip centroidal axis $x'—x$, for a fluid dynamic machine. This blade can form part of the rotor or stator of a machine such as a compressor, a gas or steam turbine, a pump or some similar machine. In the ensuing description, by way of example, it will be assumed that the blade 1 forms part of the rotor of a compressor.

The blade 1 essentially comprises a streamlined or airfoil section 2 arranged around a core 3.

The airfoil section 2 is constituted by the superimposition upon the core 3, of a plurality of superimposed layers, A, B, C, . . . F of a composite fibrous material. The latter is composed, for example, of a matrix of synthetic resin in which there is incorporated a fibrous reinforcement having high-grade mechanical characteristics and constituted, for example, by fibres or filaments (possibly woven) of carbon or boron.

The core 3 is made of a metal chosen in order to exhibit mechanical and physical characteristics as close as possible to those of the composite fibrous material. In the case of the aforestated composite fibrous material (fibres of carbon or boron and a matrix of synthetic resin) it is advantageous to utilize a core of titanium. At its bottom end, the core 3 has a portion 3a likewise made of metal projecting beyond the airfoil section 2 to form a blade fixing root. The root portion 3a is designed to be attached, for example, in a dove-tail groove formed in the circumference of a compressor disc or drum (not shown).

The layers A . . . F of composite fibrous material are produced from sheets or plates of said material, which are cut in a geometric shape such that after superimposition of said layers the resultant blade profile accords with that desired. At the time of cutting these layers, account is also taken, as will be explained hereinafter, of the orientation of the fibres in the different layers in relation to the axis $x'-x$ of the blade.

At the interface between the metal core 3 and the composite fibrous material 2 there is a bonding material 4, such as an adhesive or a material of the same composition as the matrix. The assembly constituted by the core 3 and the layers A . . . F, stacked in the correct manner, is subsequently arranged in a mould of appropriate shape where it is heated and subjected to pressure. The various layers are thus bonded to one another and to the core. To improve the mutual adhesion between the composite fibrous material and the core 3, the latter can be formed with openings 3b through which said material or the matrix can penetrate.

Hereinafter, the symbol $\alpha$ will be used to designate the angle subtended between the general direction of the fibres in a layer, and the axis $x'-x$ of the blade.

As explained hereinbefore the metal and the composite fibrous material exhibit different mechanical and physical properties despite the precautions taken right from the start in order to ensure the highest possible degree of compatibility between the two materials. An additional source of difficulty resides in the fact that the composite fibrous material, by its very nature, is highly anisotropic, in particular as far as its modulus of elasticity and its coefficient of thermal expansion are concerned.

At this point in the explanation, it is worthy of note that the essential advantage of a composite fibrous material with high-grade characteristics, resides in the lightness of this material, coupled with very high tensile strength and very high modulus of elasticity. However, this advantage cannot be exploited in full unless the material in question is stressed in a direction which does not differ too radically from the direction of its fibres. In other words, if the stresses to which the material is subjected are applied in directions radically different to the preferred direction hereinbefore referred to, the aforesaid mechanical properties are very substantially diminished.

It would, therefore, be advisable in the case of a blade chiefly subjected to tensile stresses (due to centrifugal forces) and to bending and torsional stresses (due to aerodynamic loading on the blade) to utilize composite fibrous material in which the fibres are orientated virtually parallel to the axis $x'-x$ of the blade.

However, under these circumstances, the modulus of elasticity of the composite fibrous material substantially higher than that of the metal of which the core 3 is made, so that the composite fibrous material and the core 3 of the blade in operation, undergo different deformations. Shear stresses thus develop in the bonding material 4 located at the interface between the said composite fibrous material and the core said metal. These shear stresses, if they exceed the fatigue resistance of said bonding material, can, in an extreme case, lead to dislocation of the blade by detachment of the airfoil section 2 from the core 3.

Like the modulus of elasticity, the coefficient of thermal expansion of the composite fibrous material is radically dependent upon the direction in relation to the general direction of the fibres in the layer in question. It has been found, in other words, that the coefficient of thermal expansion has a maximum value in a direction perpendicular to the general direction of these fibres, and a minimum value in said general direction. In the case referred to hereinbefore of a composite fibrous material, the fibres of which are orientated substantially parallel to the axis $x'-x$ of the blade, the coefficient of expansion of the material becomes smaller than that of the metal of which the core is made, with the result that in a manner similar to that hereinbefore described in respect of the modulus of elasticity there is again a risk that the cohesion of the blade assembly will be impaired.

The arrangements in accordance with the invention, which will be described hereinafter, are concerned in a general way with diminishing the aforesaid drawbacks to a very large extent.

In the following, by way of example, the case will be considered of a blade the airfoil section 2 of which, made of composite fibrous material, is constituted by the superimposition of six layers A, B, C, D, E, F, the layer A being the innermost layer (i.e., the layer next to the core 3) and the layer F being the outermost or superficial layer (i.e., the layer next to the surface of the airfoil section 2) of the blade.

In accordance with the invention the superimposed layers A. . . F are arranged with an orientation such that the angle $\alpha$ subtended by the general direction of the fibres of a layer, and the axis $x'-x$, diminishes in absolute value from a maximum value for the innermost layers A, B to a minimum value for the outermost layers E, F.

The choice of the angle of orientation $\alpha$ of each of the successive layers, is made on the basis of a compromise which takes into account:

the various mechanical stresses (tensile bending and torsional stresses) which the blade has to withstand;

the natural frequency which the blade is to have in operation;

the respective moduli of elasticity and coefficients of thermal expansion of the metal and the composite fibrous material, taking into account in respect of the latter the angle of orientation $\alpha$ of each of the layers in question.

To this end, a start is made by arranging the innermost layer or layers A and B so that the modulus of elasticity and the coefficient of thermal expansion of these two layers, in the direction of the blade axis $x'-x$ is as close as possible to that of the core 3. The angle $\alpha$ then has the aforesaid maximum value. By way of example, it can be mentioned that this maximum value ranges (in absolute terms) between 50° and 60°. The layer A will, for example, be arranged at an angle of plus 50° and the layer B be arranged at an angle of minus 50°.

This range of angular values takes account of the following considerations:

for an angle $\alpha$ of less than 45° the modulus of elasticity rises very rapidly and tends to exceed that of the metal;

by contrast, if the angle $\alpha$ approaches 90° it is the coefficient of expansion of the composite fibrous material which reaches too high a value. The aforesaid range of angular values, thus corresponds to convenient intermediate values, both of modulus of elasticity and of coefficient of thermal expansion of the composite fibrous material. Then, intermediate layers, such as C and D, are arranged in accordance with an angle $\alpha$ which is less than the aforesaid maximum angle. Finally, the outermost layers E and F are arranged with their angles of orientation $\alpha$ chosen in order to give the highest possible modulus of elasticity. The minimum value of $\alpha$, in relation to these outermost layers, is between 0° and 20°. In the case of a blade which essentially experiences bending stresses, an angle $\alpha$ of zero degree will be chosen. In the case of a blade which experiences more torsional stress, the angle $\alpha$ will advantageously be about 20°.

It will be appreciated that this progressive increase in the angle of orientation $\alpha$ of the successive layers, from the innermost to the outermost layers, makes it possible to largely reconcile the different demands or requirements hereinbefore referred to.

This progressive increase thus contributes to the attainment of a regular transfer of mechanical or thermal stresses between the airfoil section 2 of the blade and the core 3, without impairing the cohesion of the blade under the effect of differential expansion.

FIG. 3 illustrates in more detail the method of attachment of the airfoil section 2 of composite fibrous material to the core 3 of the blade. As this figure shows, the successive layers A ... F of composite fibrous material are arranged so that the layer C, for example, exhibits in relation to the adjacent underlying layer B, a portion which is offset in the direction of the root 3a of the blade. This offset portion thus forms a step, through which the layer in question is attached to the core 3.

It will be seen, furthermore, that the thickness of the core, which is at a maximum in the neighbourhood of the root 3a, decreases progressively towards the tip of the blade, so that the total thickness of the blade remains substantially constant over part at least of the blade height. Between each of the aforesaid steps and the core 3, the bonding material 4 is arranged which may be an adhesive or a material of the same composition as the matrix. This stepped arrangement makes it possible to contrive that the shear stresses induced in the bonding material 4 remain below the fatigue resistance of said material.

As shown in FIG. 1, the blade can be equipped with platforms or fins 5 designed to constitute the inner boundary of the flow of fluid through the compressor. These platforms or fins can equally well be made of a composite fibrous material constituted, for example, by short glass fibers embedded in a polyimid resin.

Figure 4:
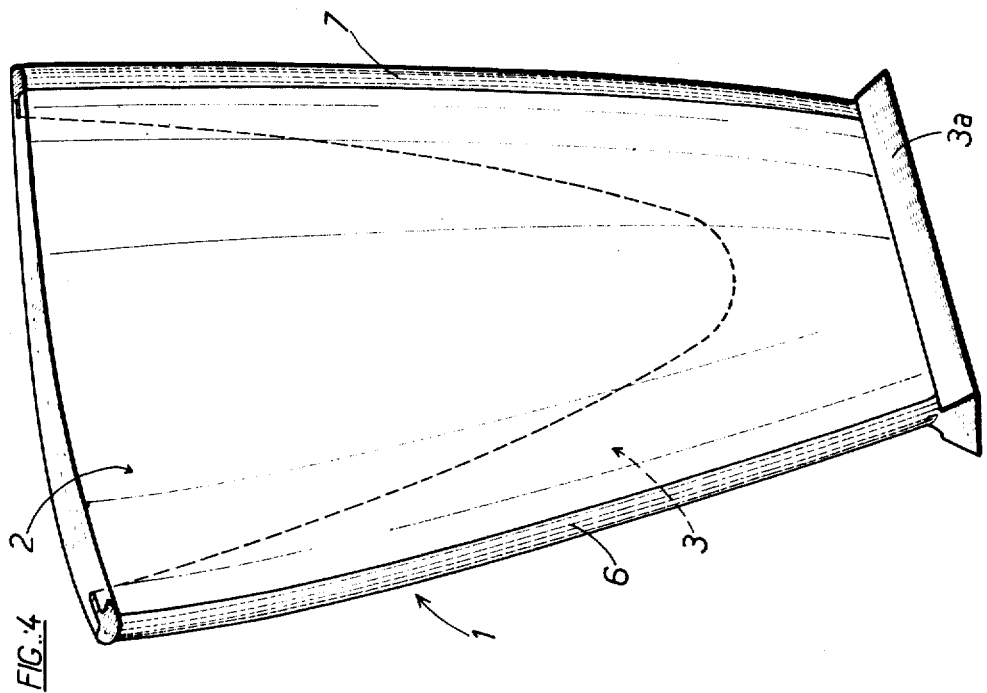
FIG. 4 is a perspective view, similar to that shown in FIG. 1 of a variant embodiment of a blade according to the invention.

FIG. 4 illustrates a variant embodiment of the invention in accordance with which the core of the blade forms part of an integral metal assembly also incorporating the leading edge 6 and the trailing edge 7 of the blade. This arrangement makes it possible to confer upon the blade assembly better resistance to abrasion or erosion under the impact of solid or liquid material.

It will be appreciated that the embodiments hereinbefore described are purely examples and are open to modification, without in so doing departing from the scope of the invention, as defined in the appended claims.

We claim:

1. In a blade for a fluid dynamic machine, said blade comprising an airfoil section having a root-to-tip centroidal axis and constituted by the superimposition, upon a metal core, of a plurality of superimposed layers of composite fibrous material, and a root section constituted by a metal portion integral with and projecting from said metal core beyond said airfoil section, the improvement wherein said layers of composite fibrous material are arranged each with an orientation such that the angle $\alpha$ made between the general direction of the fibers in a layer and said axis of the blade, diminishes, in absolute value, from a maximum value for the innermost layer or layers which are next to the core, to a minimum value for the outermost layer or layers which are next to the surface of the airfoil section.

2. A blade as claimed in claim 1, in which said maximum value ranges, in absolute terms, between 50° and 60°.

3. A blade as claimed in claim 1, in which said minimum value ranges, in absolute terms, between 0° and 20°.

4. A blade as claimed in claim 1, in which two adjacent layers are arranged respectively at an angle of orientation of plus $\alpha$ and minus $\alpha$.

5. In a blade for a fluid dynamic machine, said blade comprising an airfoil section having a root-to-tip centroidal axis and constituted by the superimposition, upon a metal core, of a plurality of superimposed layers of composite fibrous material, and a root section constituted by a metal portion integral with and projecting from said metal core beyond said airfoil section, the improvement wherein said layers of composite fibrous material are arranged each with an orientation such that the angle $\alpha$ made between the general direction of the fibers in a layer and said axis of the blade, diminishes, in absolute value, from a maximum value for the innermost layer or layers which are next to the core, to a minimum value for the outermost layer or layers which are next to the surface of the airfoil section, and wherein said layers are superimposed in accordance with a stepped disposition such that one layer, in relation to an adjacent underlying layer, has a portion offset in the direction of the blade root, said offset portion forming a step by which the layer in question is attached to the core of the blade.

* * * * *